US008514597B2

(12) United States Patent
Svensson

(10) Patent No.: US 8,514,597 B2
(45) Date of Patent: Aug. 20, 2013

(54) CHAIN-LINK CONVERTER, METHOD FOR STARTING CHAIN-LINK CONVERTER AND STATIC COMPENSATOR SYSTEM

(75) Inventor: Jan R. Svensson, Vasteras (SE)

(73) Assignee: ABB Technology AG (CH)

( * ) Notice: Subject to any disclaimer, the term of this patent is extended or adjusted under 35 U.S.C. 154(b) by 102 days.

(21) Appl. No.: 13/102,825

(22) Filed: May 6, 2011

(65) Prior Publication Data

US 2011/0205768 A1    Aug. 25, 2011

Related U.S. Application Data

(63) Continuation of application No. PCT/EP2008/065160, filed on Nov. 7, 2008.

(51) Int. Cl.
 *H02M 1/36* (2007.01)

(52) U.S. Cl.
USPC .......................................................... 363/49

(58) Field of Classification Search
USPC ..... 363/49, 65, 67, 68, 71, 98, 132; 323/205, 323/207
See application file for complete search history.

(56) References Cited

U.S. PATENT DOCUMENTS

| | | | |
|---|---|---|---|
| 5,642,275 A | 6/1997 | Peng et al. | |
| 7,230,837 B1 * | 6/2007 | Huang et al. | 363/71 |
| 7,710,082 B2 * | 5/2010 | Escobar Valderrama et al. | 323/207 |
| 7,869,234 B2 * | 1/2011 | Kazlauskas | 363/44 |

FOREIGN PATENT DOCUMENTS

DE        10103031 A1    7/2002

OTHER PUBLICATIONS

International Preliminary Report on Patentability; PCT/EP2008/065160; Jan. 21, 2011; 7 pages.
International Search Report and Written Opinion of the International Searching Authority; PCT/EP2008/065160; Mar. 23, 2009; 13 pages.
Marquardt, et al.; "New Concept for High Voltage-Modular Multilevel Converter"; Power Electronics Specialists Conference, Jan. 1, 2004; pp. 1-6.
Hanson, et al.; "STATCOM: A New Era of Reactive Compensation"; Power Engineering Journal; vol. 16; Jun. 2002; pp. 151-160.

* cited by examiner

*Primary Examiner* — Matthew Nguyen
(74) *Attorney, Agent, or Firm* — St. Onge Steward Johnston & Reens LLC

(57) ABSTRACT

A chain-link converter including one or more phases. The one or more phases each includes one or more series-connected converter cells. The chain-link converter includes a power source connected to a converter cell of one of the one or more phases. A cost-efficient start-up of the converter is provided. The invention also relates to a corresponding static compensator system and a method.

20 Claims, 3 Drawing Sheets

CHAIN-LINK CONVERTER, METHOD FOR STARTING CHAIN-LINK CONVERTER AND STATIC COMPENSATOR SYSTEM

CROSS-REFERENCE TO RELATED APPLICATIONS

The present application is a continuation of pending International patent application PCT/EP2008/065160 filed on Nov. 7, 2008 which designates the United States, the content of which is incorporated herein by reference.

FIELD OF THE INVENTION

The invention relates to the field of power compensation in a high-voltage power network, and in particular to static compensators based on chain-link converters.

BACKGROUND OF THE INVENTION

Static Var Compensator (SVC) systems have been used in power networks for many years for controlling generation and absorption of reactive power in a power network in order to provide voltage support, improve transient stability and to damp oscillations. A STATCOM (STATic COMpensator) is a kind of a SVC, being a Voltage Source Converter (VSC) based device that can act as either a source or sink of reactive AC power to the power network. The STATCOM can also provide active power if it is connected to a DC power source.

FIG. 1 illustrates a prior art two-level static compensator 1 without any transformers to step down the power network voltage. The static compensator 1 comprises a voltage source converter (VSC) 2 connected at its DC side to a capacitor 3 and at its AC-side to a power network 8, also denoted grid.

The conventional two-level VSC 2 comprises three phase-legs P1, P2, P3, each phase-leg consisting of two series-connected valves. The two valves of phase-leg P1 are indicated at reference numerals 9a, 9b. Each valve 9a, 9b in turn comprises a transistor with an anti-parallel diode, or rather, in order to manage high voltages, each valve comprises a number of series-connected transistors, for example Insulated Gate Bipolar Transistors (IGBTs), each IGBT having an anti-parallel diode.

The VSC 2 is connected to the grid 8, in FIG. 1 comprising a three phase network, via a phase reactor 4, via a starting resistor 5 connected in parallel with a switch 6 and via an AC circuit breaker 7 in each phase. Each phase, or at least two of them, comprises such phase reactor, starting resistor, switch and circuit breaker. The respective phases are connected to the middle point of the respective phase-leg P1, P2, P3, i.e. connected between the respective valves as illustrated in the figure. It is possible to reduce the number of components by equipping only two of the phases with the starting resistor connected in parallel with the switch. Only one phase is described in the following in order to simplify the description, but it is understood that the phases are similar.

When the grid-connected VSC 2 is to be energized and started, the circuit breaker 7 is switched so as to provide a current path from the grid 8 through the starting resistor 5, the phase reactor 4, and through the diodes of the VSC 2 so as to charge the capacitor 3. When the capacitor voltage has reached a predetermined level, the starting resistor 5 is short-circuited by closing the parallel-connected switch 6. As the starting resistor 5 is short-circuited, the capacitor voltage will increase a bit more and when it is high enough, the valves of the VSC 2 are deblocked and start to switch. The capacitor voltage is then controlled up to its reference value.

The starting resistor 5 is provided in order to protect the diodes of the VSC 2 from being damaged by a too high and/or too long-lasting current surge, which could occur upon closing the AC circuit breaker 7 without the use of the starting resistor 5.

The stress put on the valves, and in particular the diodes, of the VSC 2 depend on several factors, for example the size of the DC-side capacitor 3, the size of the phase reactors 4 and on the voltage levels of the power network 8.

A chain-link converter comprises a number of series-connected cells, each cell comprising a capacitor, besides the valves. The DC-capacitor of each such cell is rather big compared to the above described two-level static compensator 1, when seen in relation to the total effect of the system. Having a large capacitor entails having a rather large current through the diodes during a relatively long duration before the capacitor is charged enough to start switching the valves of the chain-link converter. This in turn entails the risk of the diodes being damaged during the start-up of the converter.

Although the starting resistors and switches provide a functioning solution, it is a rather expensive solution and it would be desirable to lower the costs of the converter. It is conceivable to use diodes able to handle larger currents, but this is still an expensive solution.

SUMMARY OF THE INVENTION

It is an object of the invention to provide a chain-link converter overcoming or at least mitigating the above-mentioned problems. In particular, it is an object of the invention to provide an improved chain-link converter and also an improved starting procedure of such chain-link converter.

It is another object of the invention to provide a chain-link converter wherein the stress put on the included diodes is minimized and related damages eliminated.

It is yet another object of the invention to provide a chain-link converter having a cost-efficient design, eliminating the prior art starting resistors and switches.

These objects, among others, are achieved by a chain-link converter and by a method as claimed in the independent claims.

In accordance with the invention a chain-link converter is provided comprising one or more phases. The one or more phases each comprise one or more series-connected converter cells. The chain-link converter is characterised by a power source that is connected to a converter cell of one of the one or more phases. By means of the invention, the diodes of the chain-link converter cells experience no stress and a reliable converter is provided. Further, by means of the innovative start-up arrangement of the chain-link converter, the starting resistors and switches can be omitted, thus providing a more cost-efficient solution. Further yet, the chain-link converter can easily be adapted to a wide range of power network voltages by using a suitable number of cells.

In accordance with an embodiment of the invention, each of the converter cells comprises four valves arranged in an H-bridge connection. Preferably, each valve comprises an insulated gate bipolar transistor with an anti-parallel diode. Conventional chain-link converter components can thus be utilized.

In accordance with another embodiment of the invention, the chain-link converter comprises three phases connected in a delta configuration. By arranging the phases in a delta configuration, the DC-capacitors of all phases can be charged to their reference values by the single power source, connected to a single one of the converter cells. A very cost-efficient solution is thus provided.

The invention also relates to a corresponding method, and to a static compensator system for providing reactive power to a power network, whereby advantages similar to the above are achieved.

DETAILED DESCRIPTION OF THE INVENTION

Figure 1:
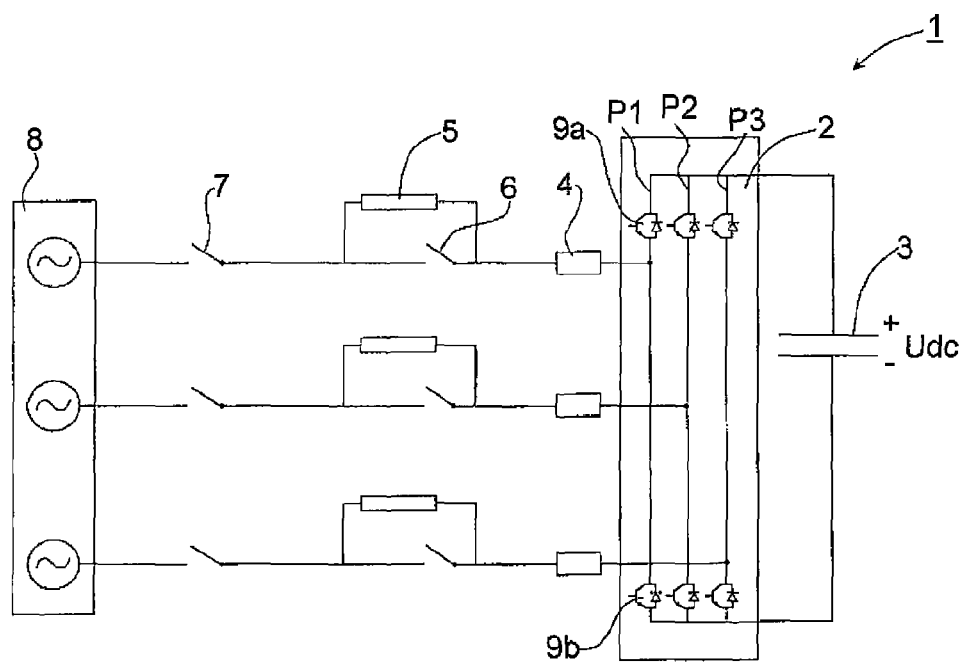
FIG. 1 illustrates a prior art two-level static compensator.

FIG. 1 has already been described in the introductory part of the application and will not be described further.

Figure 2:
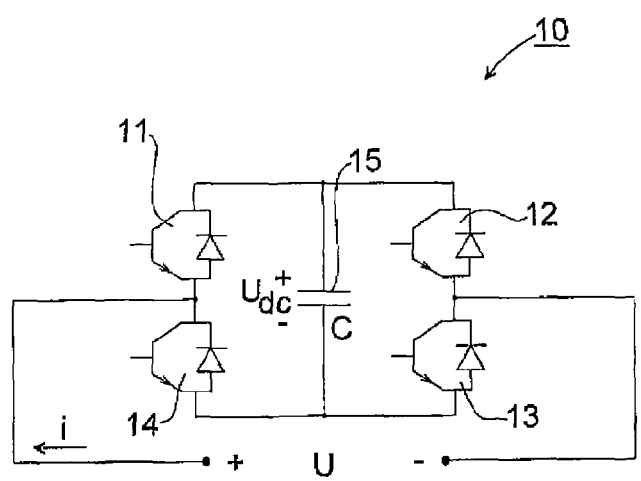
FIG. 2 illustrates one cell of the chain-link converter in accordance with the invention.
Figure 3:
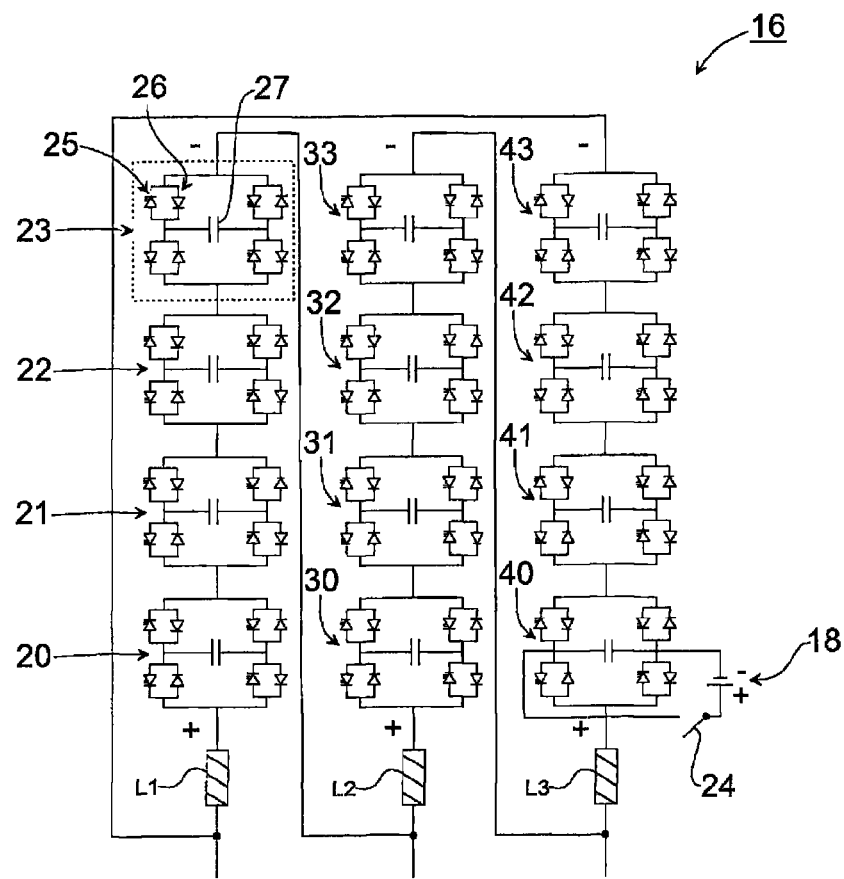
FIG. 3 illustrates an embodiment of the chain-link converter in accordance with the invention.
Figure 4:
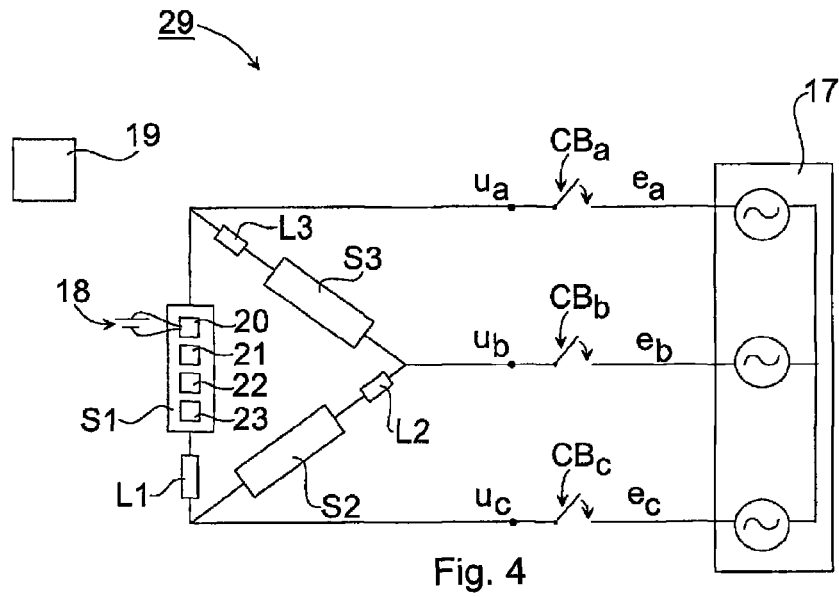
FIG. 4 illustrates the chain-link converter of FIG. 3 connected to a power network.
Figure 5:
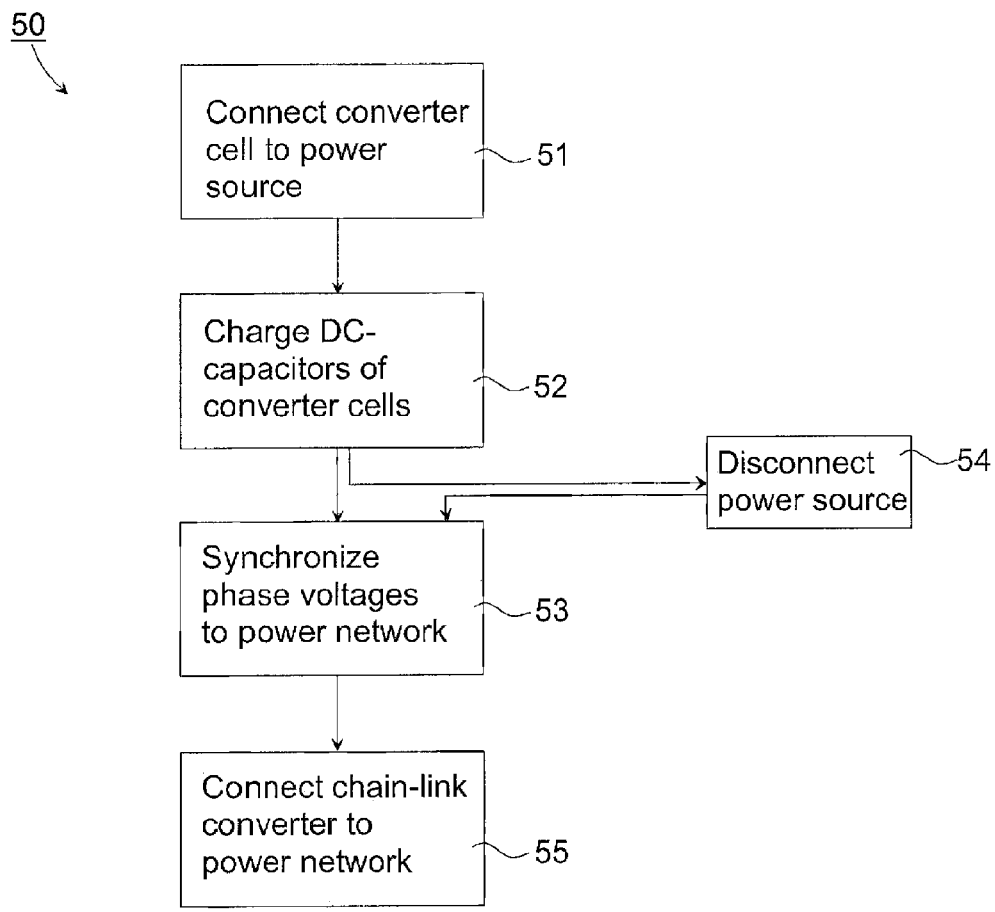
FIG. 5 illustrates steps of a method in accordance with the invention.

Same reference numerals are used throughout the FIGS. 2-4 for denoting same or corresponding parts.

FIG. 2 illustrates one converter link, also denoted converter cell, of a chain-link converter in accordance with the present invention. The converter cell 10 comprises four valves 11, 12, 13, 14, each valve including a transistor switch, such as an insulated gate bipolar transistor (IGBT). In the following an IGBT is used as an example, but it is noted that other semiconductor devices could be used, for example gate turn-off thyristors (GTO) or Integrated Gate Commutated Thyristors (IGCT). A free-wheeling diode, also denoted anti-parallel diode, is connected in parallel with each IGBT. The diode conducts in the opposite direction of the IGBT. The valves 11, 12, 13, 14 are connected in an H-bridge arrangement with a capacitor unit 15.

FIG. 3 illustrates a chain-link converter 16 in accordance with the invention. The chain-link converter 16 comprises several strings, in the figure three, each string comprising converter cells. One such string is denoted phase in the following, and a phase is understood to comprise a number of series-connected converter cells. One of the converter cells has been marked with a square of dashed lines, and is identical to the converter cell 10 illustrated in and described in connection with FIG. 2. Each converter cell 20, 21, 22, 23; 30, 31, 32, 33; 40, 41, 42, 43 thus comprises four valves arranged in the H-bridge arrangement with a DC-capacitor 27, wherein each valve in turn comprises an IGBT 25 with an anti-parallel diode 26, as described above.

Each phase comprises a number of series-connected converter cells: a first phase is illustrated comprising converter cells 20, 21, 22, 23; a second phase comprises converter cells 30, 31, 32, 33; and a third phase comprises converter cells 40, 41, 42, 43, 44. Each phase is connected to a phase reactor, in the figure illustrated at reference numerals L1, L2 and L3. The phases of the chain-link converter 16 are arranged in a delta connection and the chain-link converter 16 is connectable to a power network, schematically illustrated at 17.

In accordance with the invention, one converter cell is connected to an external DC power source 18, e.g. a battery. More specifically, one of the converter cells has the power source 18 connected to its DC-side. The power source 18 may for example be a 2 to 3 kV battery. By means of the power source 18, the starting of the chain-link converter 16 is highly improved, as will be described next.

FIG. 4 illustrates the chain-link converter 16 of FIG. 3 connected to the power network 17. The three delta connected phases of the chain-link converter 16 are denoted S1, S2 and S3, respectively, in the figure. Each phase S1, S2, S3 is in conventional manner provided with a circuit breaker, denoted $CB_a$, $CB_b$ and $CB_c$.

For starting up the chain-link converter 16, the power source 18 is connected to one of the converter cells of one of the phases S1, S2, S3, as described above. This first step of the starting up is denoted mode 1. The IGBTs of the converter cell being connected to the power source 18 are switched and thus all DC-capacitors of the converter cells of the chain-link converter can be charged. That is, since the three phases S1, S2, S3 are delta connected, the capacitor voltages of all converter cells can be controlled to reach their reference values. When the DC-capacitors of the converter cells are fully charged the power source 18 can be disconnected. Alternatively, the power source 18 can still be connected to the converter cell even after the DC capacitors of the converter cells have been fully charged. A switching device 24 is arranged between the power source 18 and the DC-capacitor of the converter cell 40 for enabling connection and disconnection of the power source 18.

It is noted that it is sufficient to add a power source 18 to a single converter cell of a single phase for the starting of the chain-link converter 16 to be effectuated. The converter cell being connected to the power source 18 can, but need not, be grounded in this mode 1. In an alternative embodiment, two or more electrically isolated power sources could be used, being connected to a respective converter cell.

Thereafter, a mode 2 is initiated, wherein the phase voltages $u_a$, $u_b$, $u_c$ are synchronized in conventional manner to the grid phase voltages $e_a$, $e_b$, $e_c$ so as to have same amplitudes, same frequencies and phases, in order to avoid current transients etc. Thereafter the circuit breakers $CB_a$, $CB_b$ and $CB_c$ can be closed and the chain-link converter 16 can initiate the desired power network support. In this mode 2, the converter cell being connected to the power source 18 cannot be grounded.

The chain-link converter 16 is controlled by a control device, illustrated schematically at reference numeral 19 of FIG. 4, e.g. for effectuating the switching of the valves of the converter cells 20, 21, 22, 23, 30, 31, 32, 33, 40, 41, 42, 43, and for controlling the capacitor voltages of all converter cells etc. The same control device 19 can be used for controlling the power source 18, i.e. for connecting the power source 18 to the one converter cell. The power source 18 may for example be connected to the converter cell via the controllable switch 24.

The number of converter cells can be suitably chosen depending on the power network voltages; the higher network voltage, the more converter cells are needed. For example, for a power network of 12 kV only a few converter cells can be sufficient, whereas power networks handling up to about 100 to 130 kV would require more than 100 converter cells.

The invention also provides a corresponding method for starting the chain-link converter 16 as described above. The method 50 comprises a first step 51 of connecting a converter cell of one of the phases S1, S2, S3 to the voltage source 18. In the next step, step 52, the DC-capacitors of the converter cells 20, 21, 22, 23; 30, 31, 32, 33; 40, 41, 42, 43 are charged to a suitable level. In the final step, step 53, the phase voltages $u_a$, $u_b$, $u_c$ of the phases S1, S2, S3 are synchronized to the phase voltages $e_a$, $e_b$, $e_c$ of the power network 17. An improved way of starting the chain-link converter 16 is thus provided.

The method may comprise further optional steps as well. For example, a further step 54 of disconnecting the voltage source 18 from the first cell after completion of the step 52 of charging the DC-capacitors to a suitable level may be included.

The method 50 may comprise the further step 55 of connecting the phases S1, S2, S3 to the power network 17 when the phases S1, S2, S3 have reached a predetermined voltage level. This connecting of the phases S1, S2, S3 to the power network 17 may comprises switching a respective circuit breaker CB$_a$, CB$_b$, CB$_b$ that is connected to a respective one of the phases S1, S2, S3.

The invention also provides a static compensator system 29 for providing reactive power to a power network 17, see FIG. 4. Such static compensator system 29 comprises the chain-link converter 16 as described above, each of the one or more phases S1, S2, S3 of the chain-link converter 16 being connected via a respective phase reactor L1, L2, L3 and via a respective circuit breaker CB$_a$, CB$_b$, CB$_b$ to the power network 17.

The above-described provided transformerless chain-link converter 16 has a design wherein the diodes experience no stress and are not subjected to the risk of being damaged. Further, by means of the innovative start-up arrangement of the chain-link converter 16, the earlier used starting resistors and switches can be omitted, thus providing a more cost-efficient solution. This advantage is more prominent the higher voltages that are handled. For example, a power network handling voltage up to about 140 kV benefits from omitted starting resistors and switches to a higher degree than a power network handling lower voltages, such as for example 12 kV, as the components become more expensive the higher voltages they are dimensioned to handle.

What is claimed is:

1. A chain-link converter comprising three phases connected in a delta configuration, said phases each comprising one or more series-connected converter cells, said converter cells comprising valves arranged in an H-bridge arrangement with a DC capacitor, characterised by a single power source connected to said DC capacitor of a single converter cell of one of said phases.

2. The chain-link converter as claimed in claim 1, wherein each of said converter cells comprises four valves arranged in an H-bridge connection.

3. The chain-link converter as claimed in claim 1, wherein each valve comprises an insulated gate bipolar transistor with an anti-parallel diode.

4. The chain-link converter as claimed in claim 1, wherein said power source is connected to said one converter cell via a switching device, whereby said power source can be disconnected.

5. The chain-link converter as claimed in claim 1, wherein said power source is arranged to be controlled by a control device for connecting and disconnecting the power source to/from said converter cell.

6. A static compensator system for providing reactive power to a power network, comprising a chain-link converter as claimed in claim 1, each of said phases of said chain-link converter being connected via a respective phase reactor and via a respective circuit breaker to said power network.

7. A method for starting a chain-link converter comprising three phases connected in a delta configuration, said phases each comprising one or more converter cells, said converter cells comprising valves arranged in an H-bridge arrangement with a DC capacitor, characterised by the steps of:
connecting a first converter cell of one of said phases to a voltage source,
charging said DC-capacitors of said converter cells to a threshold level, and
synchronizing phase voltages of said phases to phase voltages of a power network.

8. The method as claimed in claim 7, comprising the further step of disconnecting said voltage source from said first cell after said step of charging said DC-capacitors to a threshold level.

9. The method as claimed in claim 7, comprising the further step of connecting said one or more phase legs to a power network when said one or more phases have reached a predetermined voltage level.

10. The method as claimed in claim 9, wherein said step of connecting said one or more phases to a power network comprises switching a respective circuit breaker connected to a respective one of said one or more phases, thereby accomplishing said connection to said power network.

11. A chain-link converter comprising:
three phases connected in a delta configuration where each phase includes one or more series-connected converter cells;
said converter cells each having:
a valve arranged in an H-bridge arrangement with a DC capacitor;
a single power source is connected to said DC capacitor of a single converter cell of one of said phases.

12. The chain-link converter as claimed in claim 11, wherein each of said converter cells includes four valves arranged in an H-bridge connection.

13. The chain-link converter as claimed in claim 1, wherein each valve includes an insulated gate bipolar transistor with an anti-parallel diode.

14. The chain-link converter as claimed in claim 1, wherein said power source is connected to said one converter cell via a switching device, such that said power source is disconnectable.

15. The chain-link converter as claimed in claim 1, wherein said power source is controlled by a control device for connecting and disconnecting the power source to said converter cell.

16. A static compensator system for providing reactive power to a power network, comprising a chain-link converter as claimed in claim 1, each of said phases of said chain-link converter being connected via a respective phase reactor and via a respective circuit breaker to said power network.

17. A method for starting a chain-link converter comprising three phases connected in a delta configuration, said phases each comprising one or more converter cells, said converter cells including valves arranged in an H-bridge arrangement with a DC capacitor, the method comprising the steps of:
connecting a first converter cell of one of said phases to a voltage source,
charging the DC-capacitors of the converter cells to a threshold level, and
synchronizing phase voltages of the phases to phase voltages of a power network.

18. The method as claimed in claim 17, further comprising the step of disconnecting the voltage source from the first cell after the step of charging the DC-capacitors to a threshold level.

19. The method as claimed in claim 17, further comprising the step of connecting the one or more phase legs to a power network when the one or more phases have reached a predetermined voltage level.

20. The method as claimed in claim 19, wherein said step of connecting the one or more phases to a power network comprises switching a respective circuit breaker connected to a respective one of the one or more phases.

* * * * *